United States Patent

Benjamin

[11] 3,902,237
[45] Sept. 2, 1975

[54] TIMING OF DUAL-DRIVE DIFFERENTIAL GEARING

[76] Inventor: Robert N. Benjamin, 1830 Kathryn Dr., Westlake, Ohio 44145

[22] Filed: Nov. 18, 1974

[21] Appl. No.: 524,736

Related U.S. Application Data

[63] Continuation-in-part of Ser. No. 385,834, Aug. 6, 1973, Pat. No. 3,849,862.

[52] U.S. Cl. .................... 29/407; 29/159.2; 29/428; 29/434; 74/715
[51] Int. Cl............................................. B23q 17/00
[58] Field of Search....... 29/159.2, 407, 159 R, 428, 29/434; 74/715, 424

[56] References Cited
UNITED STATES PATENTS

| | | | |
|---|---|---|---|
| 2,022,141 | 11/1935 | Morgan | 74/715 |
| 2,070,569 | 2/1937 | Asam | 74/715 |
| 2,272,161 | 2/1942 | Frederickson | 74/715 |
| 2,859,641 | 11/1958 | Gleasman | 74/715 |
| 3,355,789 | 12/1967 | Tetsull | 29/407 X |
| 3,735,647 | 5/1973 | Glaseman | 74/715 |

*Primary Examiner*—C. W. Lanham
*Assistant Examiner*—Victor A. DiPalma
*Attorney, Agent, or Firm*—Baldwin, Egan, Walling & Fetzer

[57] ABSTRACT

This disclosure relates to a differential gear mechanism utilizing two substantially indentical gear sets in a housing or cage adapted to be driven by a drive shaft. Each set has a central worm or traction gear, sometimes called a side gear, adapted to be keyed in one instance to one of the stub shafts leading to a rear wheel of an automotive vehicle. Each of these side gears is in mesh with a plurality of transfer gear complexes, each having located centrally thereof a worm wheel in mesh with the side gear and having a reversible balancing gear at each end of the worm wheel rigidly connected with the associated worm wheel and coaxial therewith. The method includes the steps of placing a reference point at the same relative position of each transfer gear complex, placing the transfer gear complexes progressively in a circle in evenly spaced positions around, and with each worm wheel meshing with, the worm gear, and utilizing the reference points to index the partial rotation of each transfer gear complex about its axis relative to the next adjoining complex.

3 Claims, 7 Drawing Figures

TIMING OF DUAL-DRIVE DIFFERENTIAL GEARING

This application is a continuation-in-part of my copending application Ser. No. 385,834 for Functional Indexing in Multiple Gear Differential filed Aug. 6, 1973, now U.S. Pat. No. 3,849,862.

This invention relates to a differential gear mechanism somewhat similar to that shown in U.S. Pat. No. 2,859,641, granted Nov. 11, 1958 to Vernon E. Gleasman, to which reference may be had for a more detailed description of the operation of this type of differential. This patented differential mechanism was satisfactory for accomplishing the purposes set forth and claimed therein, but it was somewhat noisy under certain test conditions and somewhat inefficient in delivery of power therethrough, and did not always give a good division of power between the left and right rear wheels, or drive wheels, of an automotive vehicle.

It is, therefore, an object of the present invention to efficiently mesh a plurality of transfer gear worm wheels in mesh with a side gear worm and to efficiently mesh together two half differential mechanisms so assembled. Another object is to pre-determine the transfer gear rotative position when designing dual-drive differentials of this character.

Other objects and advantages of the present invention will be apparent from the accompanying drawings and description and the essential features thereof will be set forth in the appended claims.

IN THE DRAWINGS

FIG. 4 is a side elevational view of two half differential mechanisms of the character shown in FIG. 3 completely assembled in a case; while

This invention is not limited to any specific number of transfer gear complexes composing a set of the same assembled in a differential mechanism as taught herein. The embodiments described herein involve three such transfer gear complexes as composing a complete set in a half differential gear mechanism. Two transfer gear complexes may be used, or more than three, if desired. Also, the invention is disclosed herein where each transfer gear complex consists of a centrally located worm wheel of six helices, on each end of which is a reversible balancing gear, here shown as spur gears with ten teeth each. These need not be spur gears and the number of teeth in both worm wheel and spur gears may vary according to the mechanical problem. Each side gear shown herein is a worm having ten teeth of helical configuration. Geometrically, three of such transfer gear complexes meshing with a side gear worm and utilizing balancing gears which may have varying number of teeth usually are not equally divisible into three identical meshing arrangements and it is one of the objects of the present invention to overcome this difficulty so that all of the gears involved will mesh evenly and efficiently so that in operation the power is transmitted smoothly.

Figure 3:
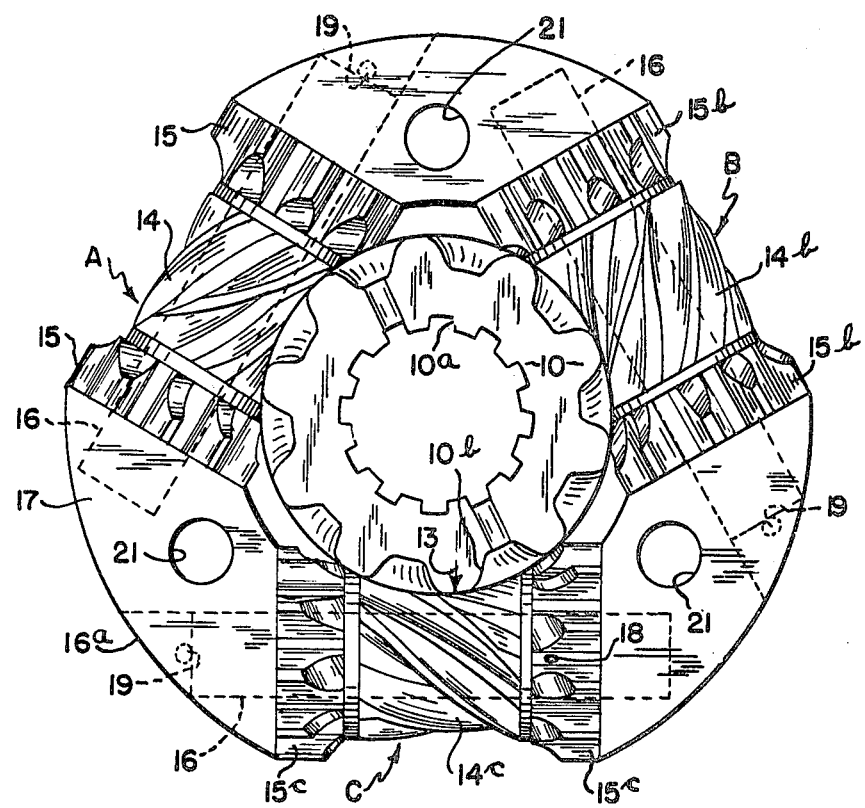
FIG. 3 is a top plan view taken along the line 3—3 of FIG. 4 and showing three transfer gear complexes assembled in a half differential mechanism as taught therein.
Figure 1:
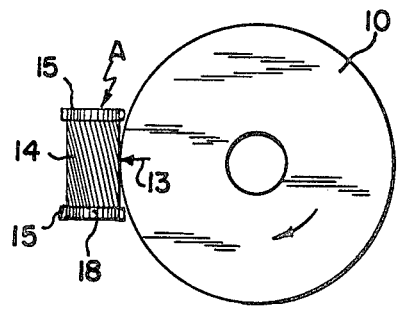
FIGS. 1 and 2 are diagrammatic sketches illustrating the method of assembling first and second transfer gear complexes in a set of three in a half differential mechanism.
Figure 2:
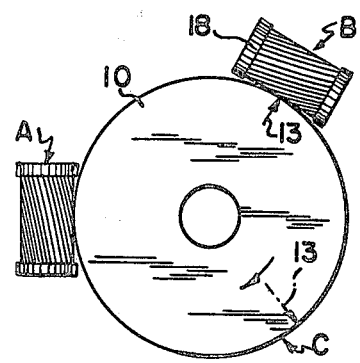
Figure 4:
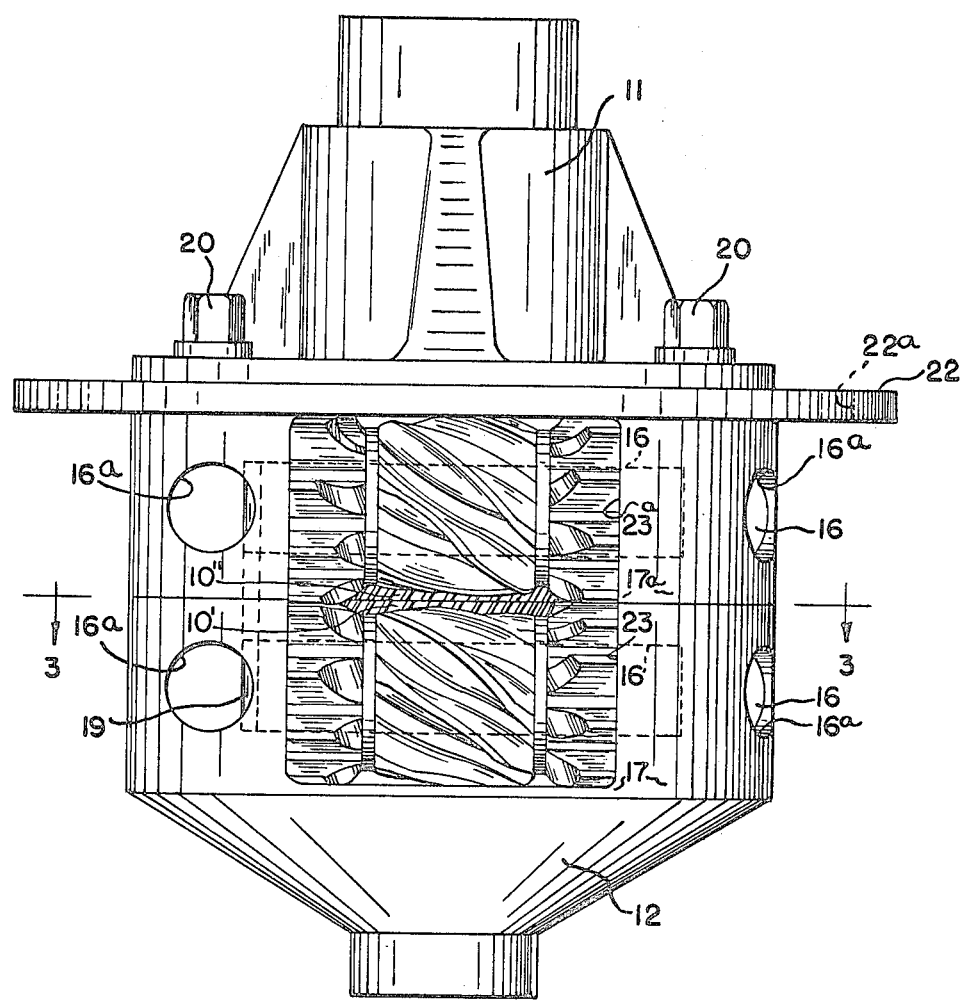

Referring now to FIGS. 1, 2 and 3, a central or side gear worm 10, sometimes referred to as a worm traction gear, is shown having internal splines for driving connection to a stub shaft going to one of the drive wheels of an automotive vehicle. It is understood that a side gear and its associated stub shaft may be integral. The worm wheel 10 of the upper half differential shown in FIG. 4 is provided with a suitable bearing (not shown) in the portion 11 of the housing. The worm wheel 10 of the lower half differential is provided with a bearing (not shown) in the housing portion 12. Referring to the drawings, each of the transfer gear complexes to be placed in mesh with the central worm consists of a unitary structure of which the central portion 14 is a worm wheel adapted to mesh with the worm gear 10 and having at opposite ends thereof reversible balancing gears 15. Each complex 14, 15, 15, is mounted for rotation about a shaft which is housed in the half differential case 17 and held in position by any suitable means such as a pin indicated at 19. An indicator or reference point 18 is placed in the same relative position of each of the transfer gear complexes marks a reference point in the case of each of the worm wheels 14.

Figure 6:
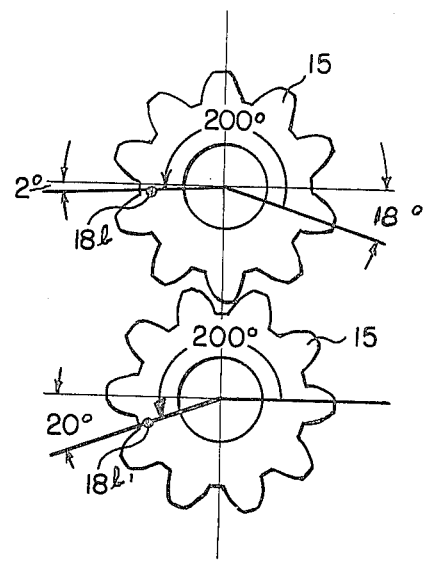
Figure 7:
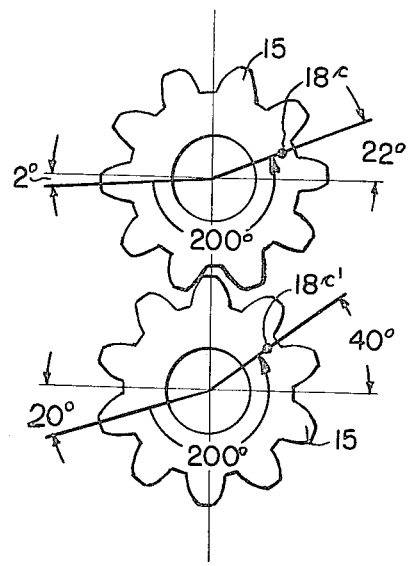

In using the method of this invention, the number of helical teeth in the worm traction gear 10 is divided by the number of helical teeth in each worm wheel 14 and this is then multiplied by 360 and divided by the number of transfer gear complexes in the half differential described. In the embodiment shown, there are ten helical teeth in the worm or side gear 10 and this is divided by six, the number of helical teeth in the worm wheel 14 which is then multiplied by 360 and divided by three which gives 200° which will be the partial rotation of the transfer gear complex B, as seen in FIG. 2. This is diagrammatically illustrated in FIGS. 5 and 6 where the reference point 18a in FIG. 5, corresponding to the transfer gear complex A in FIG. 1 is rotated about its longitudinal axis through 200° as indicated at 18b of FIG. 6. In each case, when a transfer gear complex is properly located, a shaft 16 is placed in position to hold the gear complex in the gear half case 17. Continuing another 120° around the worm gear 10, the transfer gear complex C is rotated from the position shown in FIG. 6 to the position shown in FIG. 7 according to the arrow, moving the same 200° about its longitudinal axis. The reference point is then in the location shown at 18c of FIG. 7. Again this transfer gear complex is fastened in the gear case half 17 by means of a shaft 16. One could also assemble the transfer gear complexes by counting the teeth of the spur gear 15 relative to a fixed reference point. This is done by taking the number of degrees originally determined, such as 200° in the present embodiment, and multiplying by the number of teeth in the spur gear 15 divided by 360 which, in the present embodiment, would give a figure of 5.55+ teeth. This can be checked in FIGS. 5, 6 and 7.

Figure 5:
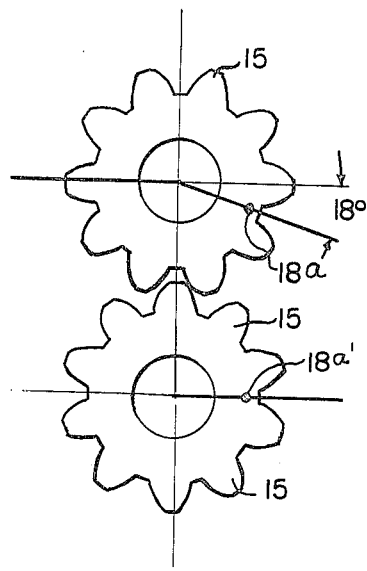
FIGS. 5, 6 and 7 are end views of three double sets of transfer gears indicating their relative rotation about their longitudinal axes for proper timing position in FIGS. 1, 2 and 3 according to this invention.

Three gear complexes are then assembled in the other half differential starting with the index point 18a' in a slightly different relative position, as seen in FIG. 5, so that the two spur gears 15 will mesh properly. It will be seen that in FIG. 6 this reference point has been moved 200° from the position of FIG. 5 to the position shown at 18b' in FIG. 6, and again the third transfer gear complex moves the same from the position of FIG. 6 200° to the position shown at 18c' in FIG. 7.

In the above described assembling operation, the worm or side gear 10 is not rotated but is held in one position while pre-positioning the transfer gear complexes A, B and C.

The method may be followed for varying numbers of gear teeth in the parts involved. For instance, with six helical teeth in the worm or side gear 10, with nine helical teeth in the worm wheel 14, and with thirteen teeth in each spur gear 15, the relative rotation between successive transfer gear positions around the worm wheel would be 180° or 3.611 teeth. With six helical teeth in the worm or side gear 10, twelve helical teeth on the worm wheel 14 and thirteen teeth on the spur gear, the relative rotation is 240° or 8.666 teeth.

The half differential mechanism just described, as assembled in the half case 17a, is the upper portion of the differential shown in FIG. 4. Then the lower portion 17 is assembled in an identical manner. The two half differentials in case portions 17 and 17a are thereafter assembled in a unit as shown in FIG. 4 with complexes A, B and C in the two half cases mutually in registration. The two half cases are held in position by stud bolts 20 that pass through openings 21a in the gear case half 17a registering with other openings 21 in the case half 17 as shown in FIG. 3. The openings 21 may be provided with threads to receive the threaded end of the stud bolt 20. The portion 12 of the differential casing is preferably formed integrally with the half case portion 17 and the portion 11 is held in the assembled position of FIG. 4 by bolts 20. The flange 22 shown in FIG. 4 is provided with a plurality of bolt holes 22a for attachment to the ring gear which forms part of the differential driving mechanism.

In a production line, one may mark the gear 10 at points 13 spaced 120 degrees apart to position the transfer gear complexes properly or window openings 23 and 23a clearly seen in FIGS. 3 and 4 opposite the gear complexes A, B and C may be used to indicate such positions. One may note on each of the complexes of a given set the position of the indicator 18 where it is visible through the windows 23 and 23a or, if it is not visible in a given instance, then a point 180° from position 18 may be indicated in such case so that the gears may be properly assembled looking through the windows 23 and 23a having noted the position of the indicators 18 of FIG. 3 when looked at horizontally. Thus assembled, the mechanism clearly embodies the present invention.

It was mentioned hereinabove that the differential case halves 17 and 17a, as described in connection with FIG. 3, are placed together in final assembly as shown in FIG. 4. If the balancing gears 15, 15b and 15c have an odd number of teeth, then they will mesh directly with similar gear teeth in the other half case. If the balancing gears have an even number of teeth, then the central worm 10 should be turned slightly in one of the half differential mechanisms to advance the balancing gears thereof by the amount of one-half tooth before the upper and lower half sets are placed together.

In any case, no matter how assembled, this invention presents a set of gears including a central worm, sometimes called a side gear, around which are assembled a plurality of transfer gear complexes, each of which is a unitary structure including a worm wheel meshing with the side gear and with a balancing spur gear at each end of the worm wheel, characterized in that a fixed index or reference point thereof serves to indicate to the mechanic the best method of assembling the differential. This invention substantially cancels out errors which occur in the machining of gears, worms and worm wheels forming elements of the differential herein described and establishes the correct index relation to facilitate proper assembly. Thereby eccentric oscillation of side or traction gears 10 is eliminated due to proper timing.

Other than as described herein, the differential gear mechanism as shown in the drawings and described in the specification operates in the same manner as a differential as the invention described in U.S. Pat. No. 2,859,641, to which reference may be had if further information is needed.

The present invention teaches the assembly of the differential gear mechanism so that all parts of intermeshing teeth and gears take their share of the load so that the mechanism provides a smoother action and has a longer life than that disclosed in U.S. Pat. No. 2,859,641.

As used in the specification and claims herein, the term "worm" or "worm gear" also includes a helical gear, regardless of the helix angle.

The method of this invention, requiring the spacing sequentially of the transfer gear complexes around a central worm or side gear, may be followed clockwise or counter-clockwise. If the teeth of a worm wheel 14 of a transfer gear complex, when held in the hand and pointing away from the holder, slope away toward the left, then the spacing of the transfer gear complexes would normally be counter-clockwise; but if the helix teeth of the worm wheel slope away toward the right, then the spacing of the transfer gear complexes would normally be clockwise.

What is claimed is:

1. The method of assembling in a case, a half differential gear mechanism comprising a central worm traction gear surrounded by a plurality of identical unitary transfer gear complexes each having a reversible balancing spur gear at each end and a worm wheel intermediate said balancing spur gears, said balancing spur gears having the same number of teeth, said balancing spur gears and worm wheel being coaxial, each transfer gear complex being assembled in said case by means of a shaft for rotation with its axis parallel to a tangent to said worm gear and with its worm wheel meshing with said worm gear; said method including placing a reference point at the same relative position of each transfer gear complex; and then placing said transfer gear complexes progressively in a circle in evenly spaced positions around, and with each worm wheel meshing with, said worm gear; utilizing said reference points to index the partial rotation of each transfer gear complex about its axis relative to the next adjoining complex to equalize the load on said complex when in use.

2. The method as defined in claim 1, including the steps of (1) dividing the number of helical teeth in said worm traction gear by the number of helical teeth in each worm wheel; (2) multiplying by 360; and (3) dividing by the number of said transfer gear complexes, thereby determining the degrees of rotation of each complex about its axis relative to the reference point of the next complex in said circle.

3. The method as defined in claim 2, including the step of (4) multiplying by the number of teeth in each balancing spur gear divided by 360; thereby determining the number of spur gear teeth for rotating each complex about its axis relative to the reference point of the next complex in said circle.

* * * * *